(12) United States Patent
Kim

(10) Patent No.: US 11,464,382 B2
(45) Date of Patent: Oct. 11, 2022

(54) DUST SCANNER

(71) Applicant: Jung Hui Kim, Busan (KR)

(72) Inventor: Jung Hui Kim, Busan (KR)

( * ) Notice: Subject to any disclaimer, the term of this patent is extended or adjusted under 35 U.S.C. 154(b) by 0 days.

(21) Appl. No.: 17/310,794

(22) PCT Filed: Feb. 24, 2020

(86) PCT No.: PCT/KR2020/002614
§ 371 (c)(1),
(2) Date: Aug. 24, 2021

(87) PCT Pub. No.: WO2020/175870
PCT Pub. Date: Sep. 3, 2020

(65) Prior Publication Data
US 2022/0125268 A1 Apr. 28, 2022

(30) Foreign Application Priority Data
Feb. 28, 2019 (KR) .................. 10-2019-0024001

(51) Int. Cl.
*F21V 5/04* (2006.01)
*A47L 9/30* (2006.01)
(Continued)

(52) U.S. Cl.
CPC ............ *A47L 9/30* (2013.01); *F21V 5/046* (2013.01); *F21V 7/05* (2013.01); *G02B 27/30* (2013.01);
(Continued)

(58) Field of Classification Search
CPC ......... F21V 5/046; F21V 7/05; F21Y 2107/30
See application file for complete search history.

(56) References Cited

U.S. PATENT DOCUMENTS 9,171,436 B1 * 10/2015 Covelli .................. G01S 19/17
9,881,466 B2 * 1/2018 Zarnowski ................ F21V 7/06
(Continued)

FOREIGN PATENT DOCUMENTS

KR 10-2011-0012327 A 2/2011
KR 101055438 B1 * 2/2011
(Continued)

OTHER PUBLICATIONS

English Translation of Kim KR101055438, published Feb. 9, 2011 (Year: 2011).*
(Continued)

*Primary Examiner* — Evan P Dzierzynski
(74) *Attorney, Agent, or Firm* — Saliwanchik, Lloyd & Eisenschenk

(57) ABSTRACT

Proposed in the present disclosure is a dust scanner allowing various foreign substances existing on a floor to be clearly identified in a field of view of a cleaner user, the dust scanner including: a plurality of LED lighting components; a transmissive body including a parabolic surface having a vertical cross-section convex toward an outside, formed to be transparent, and configured to transmit light beams emitted from the LED lighting components located at an inside thereof to an outside; and blocking plates each closing and sealing a top end and a bottom end between the LED lighting components and the transmissive body, wherein each of the LED lighting components is disposed at a focal point of the parabolic surface, whereby the light beams transmitted to the parabolic surface are projected in parallel to a floor without spreading up and down.

4 Claims, 7 Drawing Sheets

(51) Int. Cl.
*F21V 7/05* (2006.01)
*G02B 27/30* (2006.01)
*F21Y 107/30* (2016.01)
*F21Y 115/10* (2016.01)

(52) U.S. Cl.
CPC ....... *F21Y 2107/30* (2016.08); *F21Y 2115/10* (2016.08)

(56) References Cited

U.S. PATENT DOCUMENTS

| | | | |
|---|---|---|---|
| 2009/0059570 A1* | 3/2009 | Quattrini, Jr. | A47L 13/52 362/119 |
| 2010/0128195 A1* | 5/2010 | Li | G02F 1/133605 362/97.2 |
| 2011/0107587 A1* | 5/2011 | Kolb | F21V 5/046 29/592.1 |
| 2013/0208468 A1* | 8/2013 | Chen | F21V 7/0058 362/346 |
| 2016/0131818 A1 | 5/2016 | Sakaguchi et al. | |
| 2017/0116864 A1* | 4/2017 | Zarnowski | G08B 5/36 |

FOREIGN PATENT DOCUMENTS

| | | |
|---|---|---|
| KR | 10-1030133 B1 | 4/2011 |
| KR | 10-1937413 B1 | 1/2019 |

OTHER PUBLICATIONS

International Search Report dated Jun. 3, 2020 in International Application No. PCT/KR2020/002614.

* cited by examiner

DUST SCANNER

CROSS-REFERENCE TO RELATED APPLICATIONS

This application is the U.S. national stage application of International Patent Application No. PCT/KR2020/002614, filed Feb. 24, 2020, which claims the benefit under 35 U.S.C. § 119 of Korean Application No. 10-2019-0024001, filed Feb. 28, 2019, the disclosures of each of which are incorporated herein by reference in their entirety.

TECHNICAL FIELD

The present disclosure relates to a dust scanner and, in particular, to a dust scanner capable of improving cleaning efficiency by clearly identifying small foreign substances existing on a floor.

BACKGROUND ART

The internal space where people execute business such as desk job, work, or the like or reside should be cleaned regularly to maintain a clean and comfortable environment. Periodic cleaning is very important because an unclean environment may adversely affect both physical and psychological health.

In general, cleaning proceeds in a way using a vacuum cleaner to suck and remove dust and foreign substances that are easily scattered in a dry state, and then to cleanly remove the remaining dust and other contaminants adhering to a floor using a wet cloth or a steam cleaner.

However, when cleaning, a cleaner user thinks that debris or dust has been removed with a vacuum cleaner, but finds that dust is unexpectedly left here and there during performing wet cleaning. Meanwhile, residual dust lowers efficiency of wet cleaning, wherein the reason why the cleaner user is not able to cleanly remove dust with a broom or vacuum cleaner is that small foreign substances such as dust are difficult to see on the floor surface under ceiling lighting from eye level.

Although it is a bit cumbersome, it is not a big problem to reperform dry-cleaning in a general household with a relatively small area to clean. However, in cases that an area to be cleaned is quite large or the number of places to be cleaned is quite large, such as offices in a large building, reperforming dry-cleaning becomes a factor that reduces the cleaning efficiency and increases the working time.

DISCLOSURE

Technical Problem

Accordingly, the present disclosure has been made keeping in mind the above problems occurring in the related art, and an objective of the present disclosure is to provide a dust scanner that allows various foreign substances such as debris, dust, and the like existing on a floor to be clearly identified in a field of view of a cleaner user by projecting light beams at a height adjacent to the floor of an area to be cleaned.

Technical Solution

In order to accomplish the above objective, the present disclosure may provide a dust scanner, including: a plurality of LED lighting components; a transmissive body including a parabolic surface having a vertical cross-section convex toward an outside, the transmissive body being formed to be transparent and configured to transmit light beams emitted from the plurality of LED lighting components located at an inside thereof to an outside; and blocking plates each closing and sealing a top end and a bottom end between the plurality of LED lighting components and the transmissive body, wherein each of the plurality of LED lighting components may be disposed at a focal point of the parabolic surface, the focal point being spaced apart from the transmissive body by a predetermined interval, whereby the light beams transmitted to the parabolic surface may be projected in parallel to a floor without spreading up and down.

Advantageous Effects

As described above, according to the present disclosure, light beams advancing straight in parallel to a floor are projected far while being maintained to be low, so foreign substances such as dust, dirt, and the like are clearly identified in the field of view of a cleaner user through the shadows generated by and the light beams reflected from the foreign substances.

Accordingly, even when a large area is to be cleaned, efforts of locally performing recleaning because cleaning was not done well can be reduced. As a result, cleaning efficiency can be improved.

MODE FOR INVENTION

Proposed in the present disclosure is a dust scanner that allows various foreign substances such as debris, dust, and the like existing on a floor to be clearly identified in a field of view of a cleaner user by projecting light beams at a height adjacent to the floor of an area to be cleaned, the dust scanner including: a plurality of LED lighting components; a transmissive body including a parabolic surface having a vertical cross-section convex toward an outside, formed to be transparent, and configured to transmit the light beams emitted from the plurality of LED lighting components located at an inside thereof to an outside; and blocking plates each closing and sealing a top end and a bottom end between the plurality of LED lighting components and the transmissive body, wherein each of the plurality of LED lighting components is disposed at a focal point of the parabolic surface, the focal point being spaced apart from the transmissive body by a predetermined interval, whereby the light beams transmitted to the parabolic surface are projected in parallel to a floor without spreading up and down.

The scope of the present disclosure is not limited to embodiments described below, and various modifications may be made by those of ordinary skill in the art without departing from the technical gist of the present disclosure.

Hereinafter, the dust scanner of the present disclosure will be described in detail with reference to FIGS. 1 to 10 attached thereto.

Figure 4:
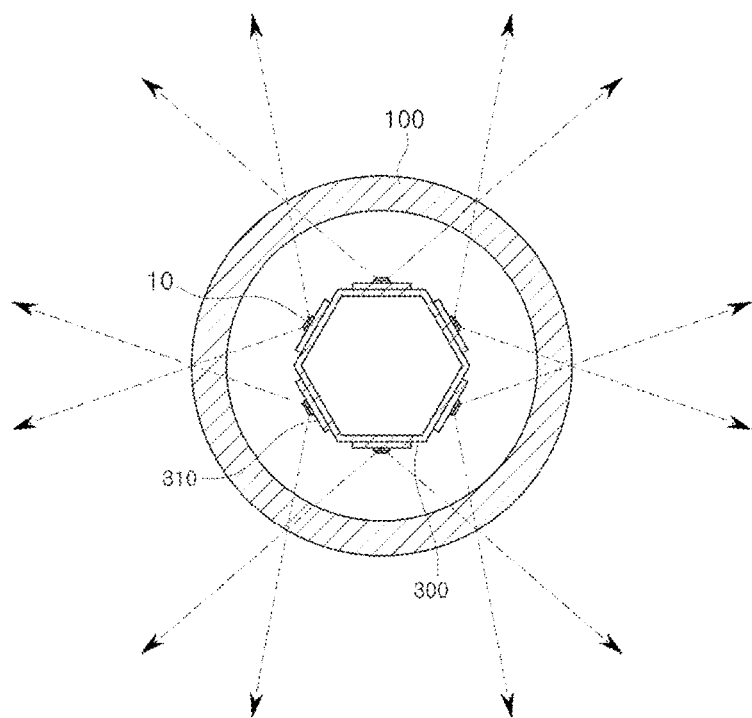
FIG. 4 is a plan view showing a structure according to the example of the dust scanner according to the present disclosure.
Figure 5A:
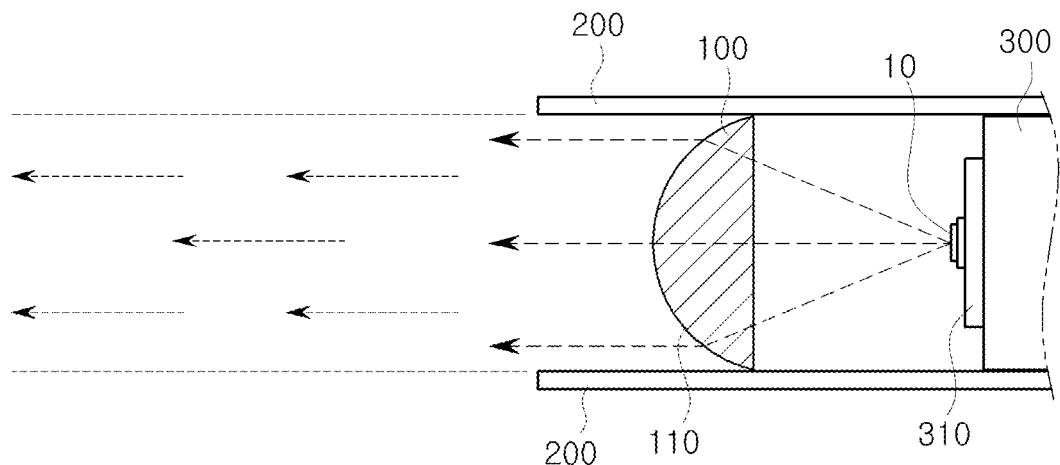
FIGS. 5A and 5B are exemplary views showing states in which each of a plurality of LED lighting components applied to the dust scanner according to the present disclosure is provided at a focal point of a parabolic surface and light beams are projected to the outside.
Figure 5B:
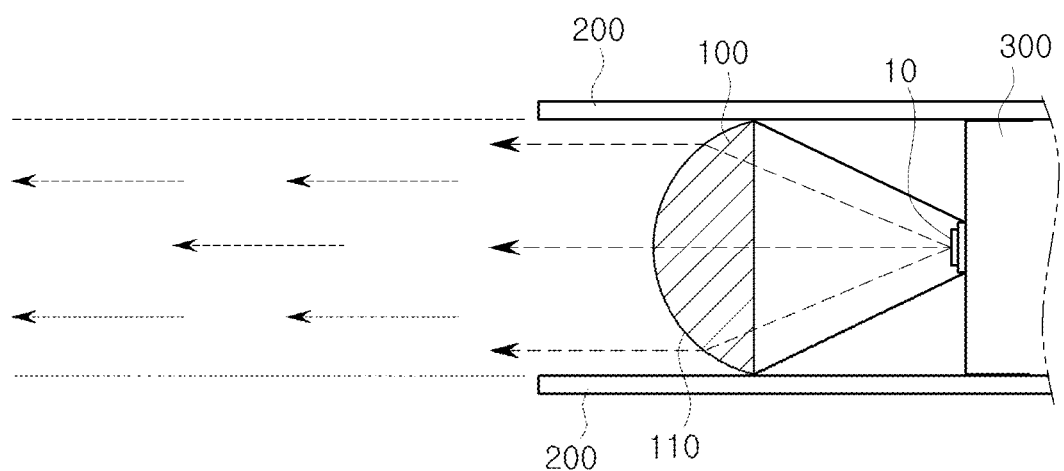

As shown in FIGS. 1 to 4, the dust scanner of the present disclosure includes the plurality of LED lighting components 10 having good straightness, and a transmissive body 100 configured to transmit light beams emitted from the plurality of LED lighting components 10 to the outside, wherein the transmissive body 100 is formed to be transparent, thereby serving as a lens and includes a parabolic surface having a vertical cross-section convex toward the outside, as shown in FIGS. 5A and 5B. Accordingly, the light beams emitted from the plurality of LED lighting components 10 located inside a transmissive body 100 are refracted while being transmitted to the parabolic surface 110 of the transmissive body 100 and are projected to the outside.

At this time, as each of the plurality of LED lighting components 10 and the transmissive body 100 are arranged to be spaced apart by a predetermined interval, the dust scanner further includes the blocking plates 200 that each close and seal the top end and the bottom end between the plurality of LED lighting components 10 and the transmissive body 100. The blocking plates 200 each block the light beams emitted from the plurality of LED lighting components 10 from advancing to a top side and a bottom side of a space between the plurality of LED lighting components 10 and the transmissive body 100, thereby serving to allow the light beams to be focused only in the outer direction of the transmissive body 100.

On the other hand, each of the plurality of LED lighting components 10 in the present disclosure is disposed at the focal point of the parabolic surface 110 as shown in FIGS. 5A and 5B. This is to use in a reverse manner a fact that the light beams projected from the outside to the inside of the convex parabolic surface 110 are collected at a certain point inside the parabolic surface 110, and thus the light beams emitted from the LED lighting components 10 disposed at the focal point are projected in parallel to the floor without spreading up and down while being transmitted to the parabolic surface 110.

As such, in the present disclosure, the light beams advancing straight in parallel to the floor are projected far while being maintained to be low, so foreign substances such as dust, dirt, and the like are clearly identified in the field of view of the cleaner user through not only the shadows generated by the foreign substances but also the light beams reflected from the foreign substances. Accordingly, even when a large area is to be cleaned, efforts of locally performing recleaning because of cleaning not being done well is reduced. As a result, cleaning efficiency is improved.

Figure 1:
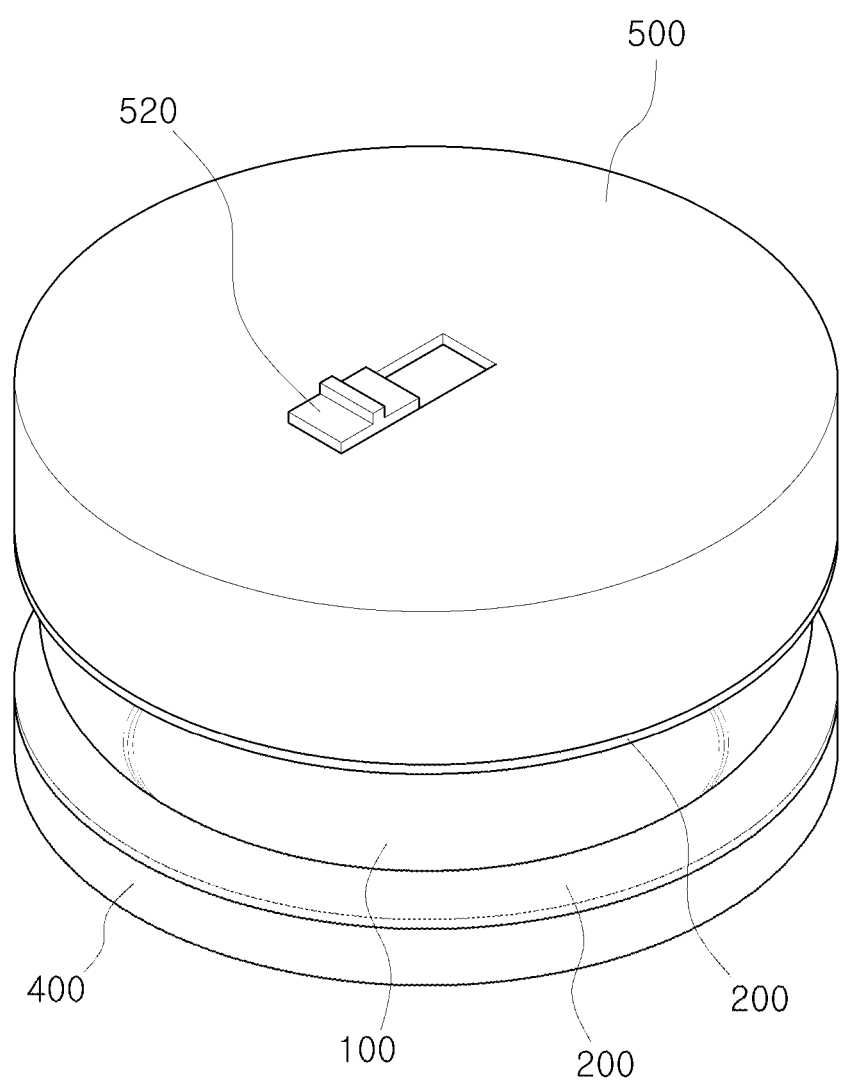
FIG. 1 is a perspective view showing an external structure according to an example of a dust scanner according to the present disclosure.
Figure 2:
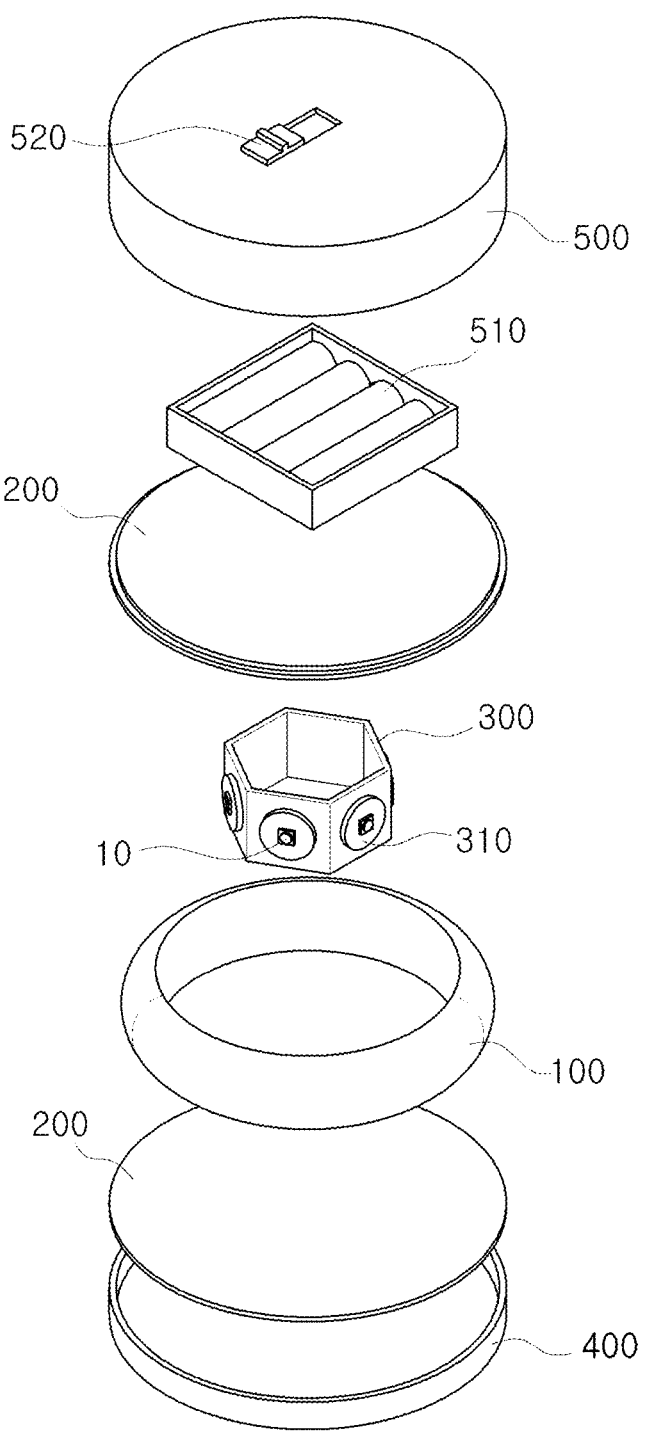
FIG. 2 is an exploded perspective view showing an internal structure of the example of the dust scanner according to the present disclosure.
Figure 3:
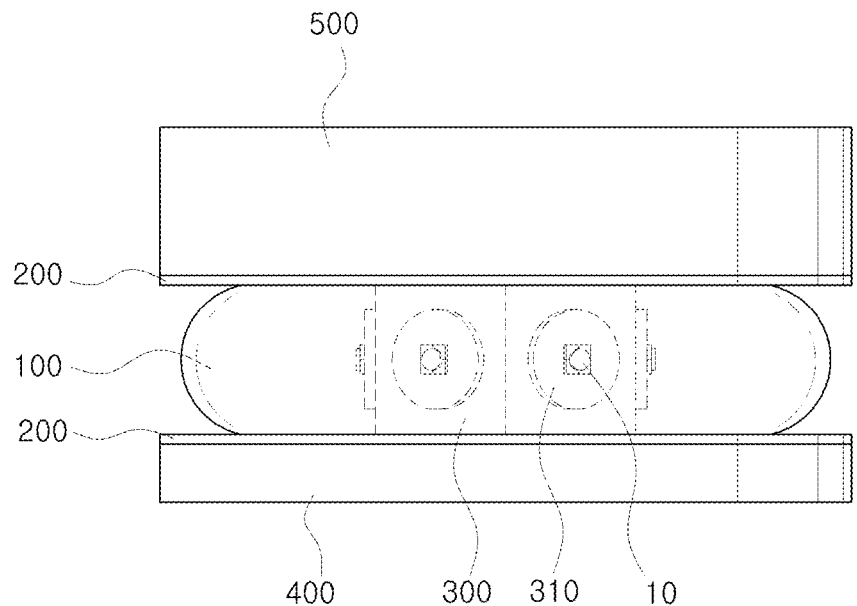
FIG. 3 is a side view showing a structure according to the example of the dust scanner according to the present disclosure.

Each of the plurality of LED lighting components 10 is disposed on each side surface of an inner body 300 having a polygonal cross-section, as shown in FIGS. 2 and 4, and allows the foreign substances to be identified by projecting the light beams at various angles when viewed from a plane view. For example, the inner body 300 may be formed in a polygonal shape such as a triangle, a square, a pentagon, a hexagon, and the like when viewed in the plane view and provided with one of the plurality of LED lighting components 10 on each side surface thereof. At this time, each of the plurality of LED lighting components 10 may be disposed at a center of each side surface of the inner body 300 so that the angles projected in the up and down direction are the same.

The transmissive body 100 may be formed such that a height of the parabolic surface 110 is the same as that of the inner body 300 and formed in a shape surrounding the outside of the inner body 300 so that the light beams may be projected 360° in all directions since the light beams are inhibited from spreading only in the up and down direction as above. That is, as shown in FIGS. 2 and 4, the transmissive body 100 is formed in a ring shape so that the light beams are projected without limitation in the left and right directions so that the light beams may be projected far over a wide range.

Figure 6:
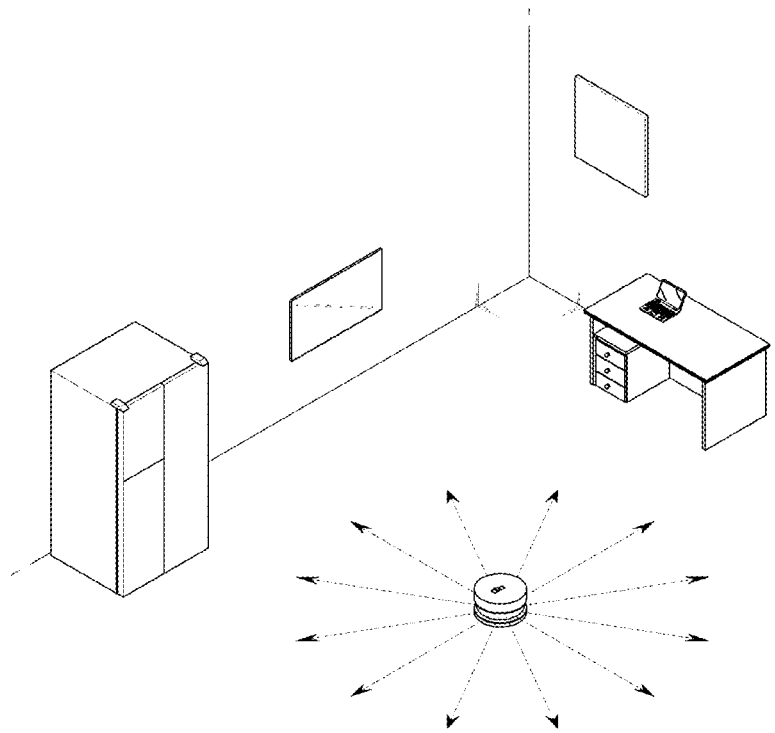
FIG. 6 is an exemplary view showing an operating state of the example of the dust scanner according to the present disclosure.

As such, the dust scanner of the present disclosure, in which the light beams are projected 360° in all directions, is provided separately from a cleaning mechanism such as a vacuum cleaner and the like, and as shown in FIG. 6, the foreign substances existing in all directions on the floor with the dust scanner of the present disclosure as a center may be identified prior to performing the cleaning.

As shown in FIGS. 2 to 4 and FIG. 5A, the inner body 300 may be provided on each side surface thereof with a reflective plate 310 capable of reflecting the light beams. Here, even a small amount portion of the light beams emitted from each of the plurality of LED lighting components 10 and directed toward the transmissive body 100 may be reflected and returned, so the reflective plate 310 is for reflecting the light beams, which are reflected and returned, back again so that the light beams may be focused toward the outside. At this time, each of the plurality of LED lighting components 10 is provided at the center of the reflective plate 310 by penetrating therethrough, thereby reflecting all the light beams returning within a certain range centering on each of the plurality of LED lighting components 10.

In addition, as shown in FIG. 5B, the inner body 300 may be provided with the reflective mirror 320 on the side surface thereof, wherein the reflective mirror 320 is formed in a funnel shape and provided to surround each of the plurality of LED lighting components 10 with a narrower diameter side thereof, whereby an inner side surface thereof may reflect the light. The reflective mirror 320 serves to reflect the partially reflected and returned light beams like the above-described reflective plate 310, thereby allowing the light beams to be focused toward the outside.

On the other hand, as shown in FIGS. 5A and 5B, the outer surface of the transmissive body 100 is composed of a convex parabolic surface 110 as described above, and an inner surface is formed to be convex toward the outside like the outer surface, thereby achieving a shape of a "block meniscus lens". In addition, it is also possible for the inner surface to be convex toward the inside as opposed to the outside surface to achieve a shape of a "double convex lens".

In addition, the transmissive body 100 may be formed such that the inner surface is formed in a plane to form a "planar convex lens" shape. That is, the vertical cross-section of the transmissive body 100 may have a hemispherical shape. In this case, the cost of manufacturing the transmissive body 100 may be reduced compared to the above two shapes. When the transmissive body 100 is formed in a shape surrounding the inner body 300, it is possible to obtain the effect that durability of at least a certain level may be ensured.

On the other hand, the blocking plates 200 may block the light beams generated only between the plurality of LED lighting components 10 and the transmissive body 100 but may be formed to be the same as the outermost point of the parabolic surface 110 or to extend beyond the outermost point of the parabolic surface 110 in order to improve the straightness for the light beams having passed through the transmissive body 100 as shown in FIGS. 1 to 3 and FIGS. 5A and 5B. This is to inhibit a phenomenon that as the light beams emitted from the LED lighting components 10 are refracted at the top end and bottom end of the transmissive body 100, some of the refracted light beams may not be projected in parallel to the floor and may spread upward or downward.

In addition, the present disclosure may be provided with a lower case 400, the lower case 400 being: placed on a floor surface by being formed in a plate shape; and provided on a top side thereof with the inner body 300 provided with the plurality of LED lighting components 10 and the transmissive body 100 surrounding the inner body 300. In addition, the lower case 400 may be provided with a first blocking plate 200 placed on the top surface thereof, and the first blocking plate 200 may be provided on a top surface thereof with the inner body 300 and the transmissive body 100.

A second blocking plate 200 corresponding to the first blocking plate 200 placed on the top surface of the lower case 400 may be placed on a top end of the inner body 300 and the transmissive body 100, and the corresponding second blocking plate 200 may be provided with an upper case 500 on a top side thereof, the upper case 500 including a power supply means 510 such as a battery at an inside thereof and a switch 520 capable of turning on/off the plurality of LED lighting components 10 on an outside thereof.

In addition, although not shown in the drawings, the upper case 500 may become a controller configured to receive power from an external outlet and to supply the power to the plurality of LED lighting components 10. The controller may be applied to both cases where the power control means is provided and is not provided and may not only serve to deliver the power to the plurality of LED lighting components 10 but also adjust an on-off time, an on-off sequence, illuminance, and the like of the plurality of LED lighting components 10 according to a user's selection or a pre-set rule.

On the other hand, the present disclosure may be applied to, for example, a head of the cleaning mechanism, a wet mop cleaner, or the like in which foreign substances such as dust and the like are substantially sucked. In this case, it is difficult to provide the plurality of LED lighting components 10 so that the light beams are projected 360° in all directions due to a structure of the head of the cleaning mechanism. Therefore, it is rather effective to identify foreign substances by allowing the light beams to be projected only in a direction in which the head of the cleaning mechanism is facing.

Figure 7:
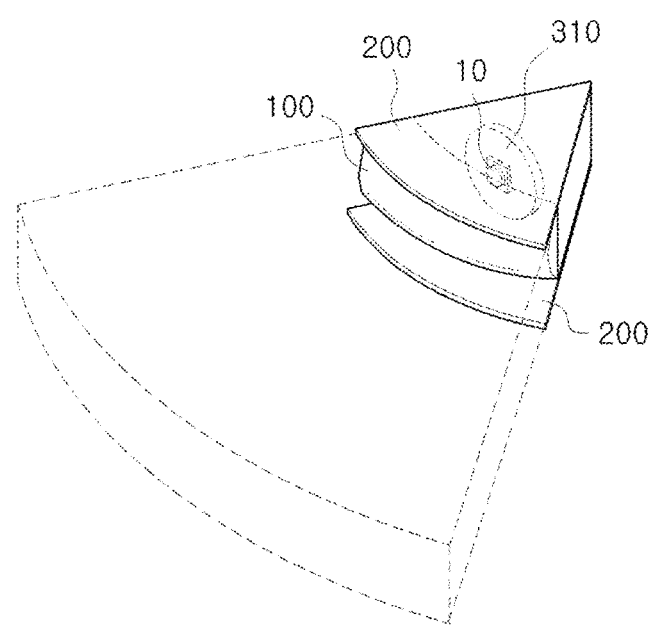
FIGS. 7 and 8 are perspective views illustrating structures of the dust scanner according to other examples.
Figure 8:
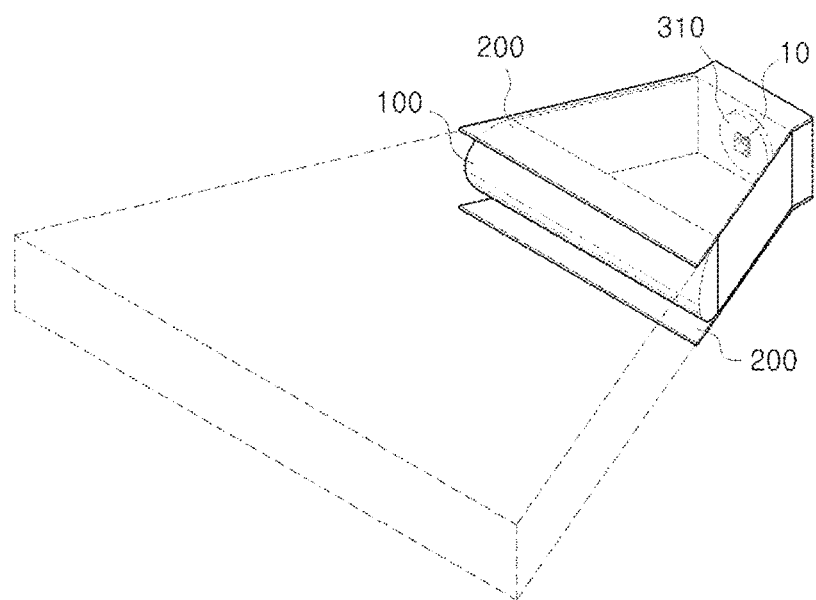
Figure 9:
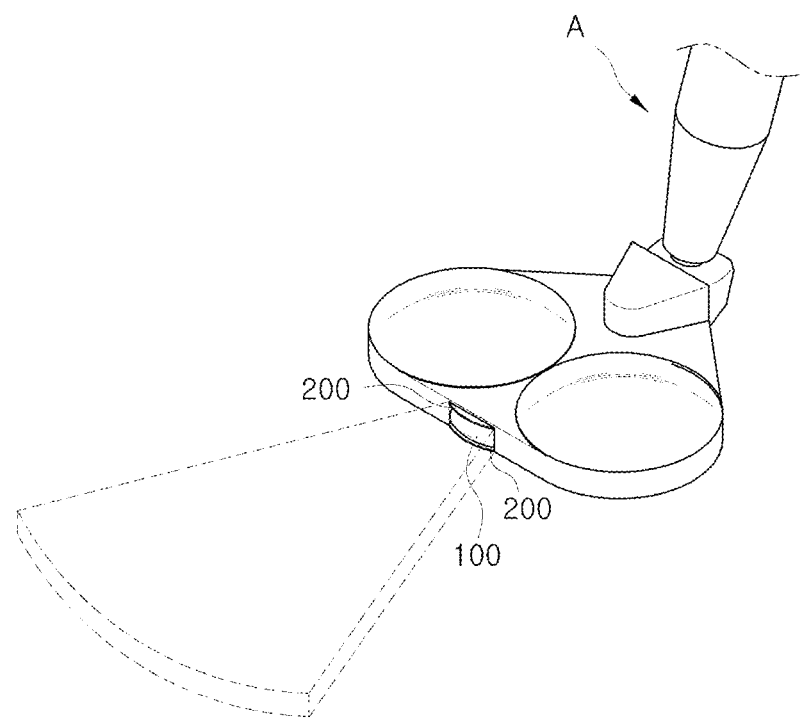
FIGS. 9 and 10 are exemplary views showing states in which other examples of the dust scanner according to the present disclosure are applied to a cleaner.
Figure 10:
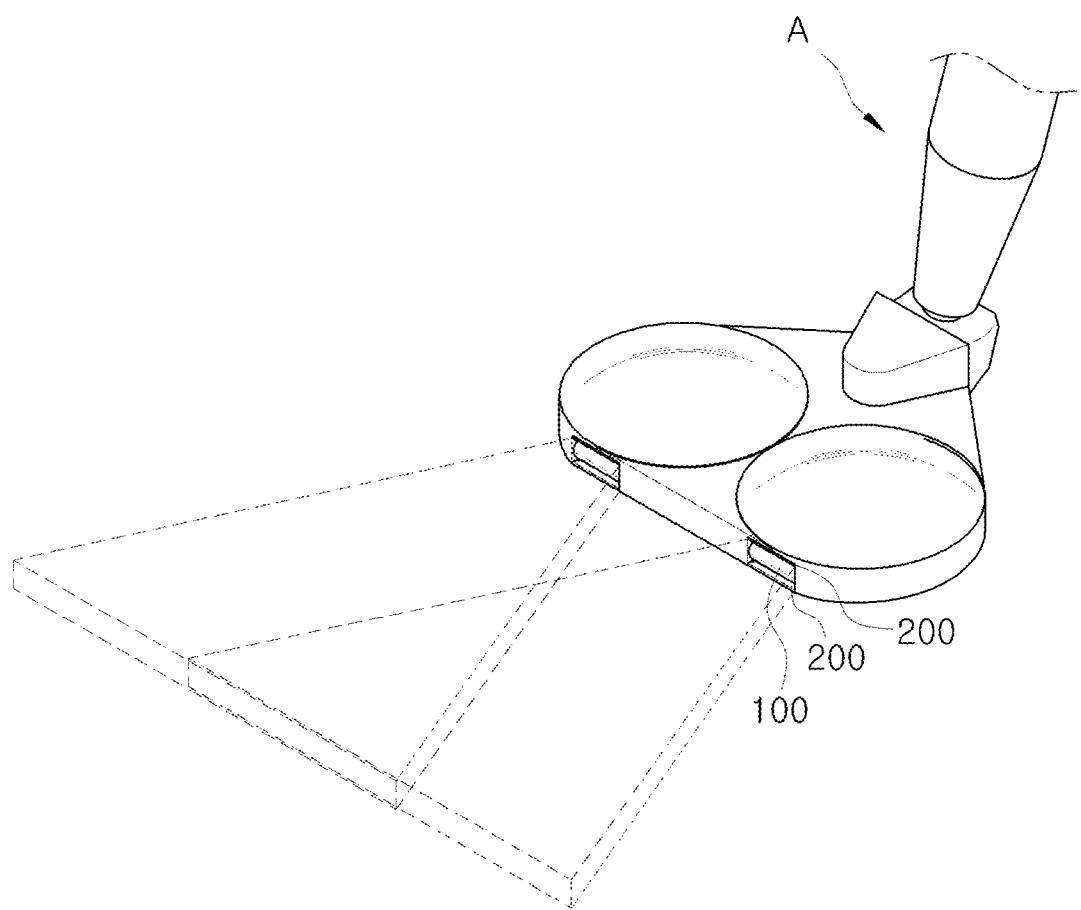

Accordingly, in order to allow the emitted light beams to be transmitted to a predetermined range of the outside in a front of the plurality of LED lighting components 10, an arrangement formed by the transmissive body 100 and the plurality of LED lighting components 10 may be a fan shape as shown in FIGS. 7 and 8 when viewed in a plan view. In addition, the plurality of LED lighting components 10 may be provided on the head of the cleaning mechanism to face the front as shown in FIGS. 9 and 10.

<Description of the Reference Numerals in the Drawings>

| A: cleaner | |
|---|---|
| 10: LED lighting | |
| 101: transmissive body | 110: parabolic surface |
| 200: blocking plate | 300: inner body |
| 310: reflective plate | 320: reflective mirror |
| 400: lower case | |
| 500: upper case | 510: power supply means |
| 520: switch | |

The invention claimed is:

1. A dust scanner, comprising:
a plurality of LED lighting components (10);
a transmissive body (100) including a parabolic surface (110) having a vertical cross-section convex toward an outside, the transmissive body being formed to be transparent and configured to transmit light beams emitted from the plurality of LED lighting components (10) located at an inside thereof to an outside; and
a plurality of blocking plates (200) each closing and sealing a top end and a bottom end between the plurality of LED lighting components (10) and the transmissive body (100),
wherein each of the plurality of LED lighting components (10) is disposed at a focal point of the parabolic surface (110), the focal point being spaced apart from the transmissive body (100) by a predetermined interval, whereby the light beams transmitted to the parabolic surface (110) are projected in parallel to a floor without spreading up and down, and
wherein the plurality of blocking plates (200) are formed symmetrically with respect to an axis of transmissive body (100) and extend so as to protrude outward beyond an outermost point of the parabolic surface (110) of the transmissive body (100) to inhibit the light beams emitted from the plurality of LED lighting components (10) from being refracted at a top end and a bottom end of the transmissive body (100).

2. The dust scanner of claim 1, wherein each of the plurality of LED lighting components (10) is disposed at a center of each side surface of an inner body (300) having a polygonal cross-section, and
the transmissive body (100) is formed in a shape surrounding an outside of the inner body (300).

3. The dust scanner of claim 2, wherein the inner body (300) is provided on each side surface thereof with a reflective plate (310) capable of reflecting the light beams, and
each of the plurality of LED lighting components (10) is provided at a center of the reflective plate (310) by penetrating therethrough.

4. The dust scanner of claim 1, wherein the vertical cross-section of the transmissive body (100) has a hemispherical shape.

* * * * *